United States Patent
Tiede

[11] 3,891,044
[45] June 24, 1975

[54] BICYCLE PROPELLING MEANS

[76] Inventor: Clair L. Tiede, Rt. No. 3, Box 227 E, Muckwonago, Wis. 53149

[22] Filed: Nov. 7, 1973

[21] Appl. No.: 413,705

[52] U.S. Cl. ............... 180/31; 180/33 D; 180/74; 74/190; 74/191
[51] Int. Cl. ........................................ B62k 11/02
[58] Field of Search ............... 74/191, 190, 207; 180/33 D, 33 C, 31, 34, 74, 65 A, 65 R

[56] References Cited
UNITED STATES PATENTS
| | | | |
|---|---|---|---|
| 1,424,581 | 8/1922 | Mepstead | 74/191 |
| 3,339,659 | 9/1967 | Wolf | 74/191 |

FOREIGN PATENTS OR APPLICATIONS
| | | | |
|---|---|---|---|
| 28,150 | 9/1917 | Germany | 180/33 D |
| 804,069 | 4/1951 | Germany | 180/31 |
| 591,640 | 7/1925 | France | 180/33 D |
| 961,942 | 4/1957 | Germany | 180/33 D |

Primary Examiner—Samuel Scott
Assistant Examiner—Allan R. Burke
Attorney, Agent, or Firm—Axel H. Johnson

[57] ABSTRACT

A bicycle propelling means employing an electric motor having a cone-shaped driving roller which engages one side of the bicycle tire. A cylindrical, freely-rotating roller engages the opposed side of the tire to assure positive contact between the cone-shaped roller and the tire. An increase or decrease in the rate of travel of the bicycle is obtained by shifting the periphery of the cone-shaped roller in a plane common to the side of the tire, thus engaging the tire at varying diameters of the roller; The rate of travel then being directly proportional to the diameter of the cone-shaped roller in contact with the tire.

2 Claims, 7 Drawing Figures

PATENTED JUN 24 1975

3,891,044

SHEET 1

PATENTED JUN 24 1975 3,891,044
SHEET 2
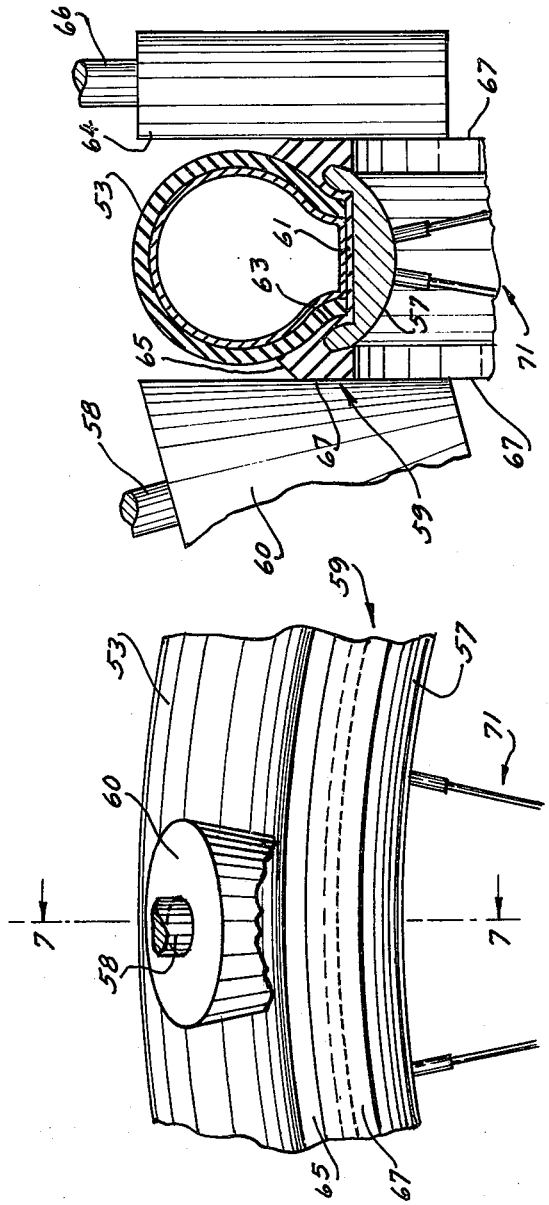

BICYCLE PROPELLING MEANS

BACKGROUND OF THE INVENTION

1. Field of the Invention

This invention concerns a bicycle-propelling means employing an electric motor, and a current supply comprising a batery.

2. Description of the Prior Art

The prior art comprises propelling means generally employing internal combustion engines which transmit power to the wheel of the bicycle by means of a belt or chain.

SUMMARY OF THE INVENTION

This invention comprises a means of propelling a bicycle, which means employs an electric motor having a cone-shaped driving member integral with the shaft thereof. The cone-shaped driving member frictionally engages the side of the bicycle tire. The motor is positionable to permit the cone-shaped driving roller to engage the tire at various diameters of the cone-shaped driving member, thus providing control of the rate of travel. An object is to provide propelling means for a bicycle that has an infinitely-variable control of the rate of travel of the bicycle. Another object is to provide a means of opposing the pressure of the cone-shaped roller in order to maintain a positive drive; one that does not permit slippage between the cone-shaped roller and the tire surface.

Further objects and advantages of this invention will become apparent from a consideration of the following detailed description. It is, however, to be understood that the invention is not to be limited to the details disclosed, but includes all such variations as fall within the spirit of the invention.

Referring to the drawings:

FIG. 3 is a view taken in the direction of 3—3 of FIG. 1.

FIG. 4 is a view taken in the direction of 4—4 of FIG. 1.

FIG. 5 is a fragmentary view comprising two opposed motors having cone-shaped rollers.

FIG. 6 is a fragmentary side view of a wheel and tire provided with an auxiliary driving rim.

FIG. 7 is a section taken at 7—7 of FIG. 6.

Figure 2:
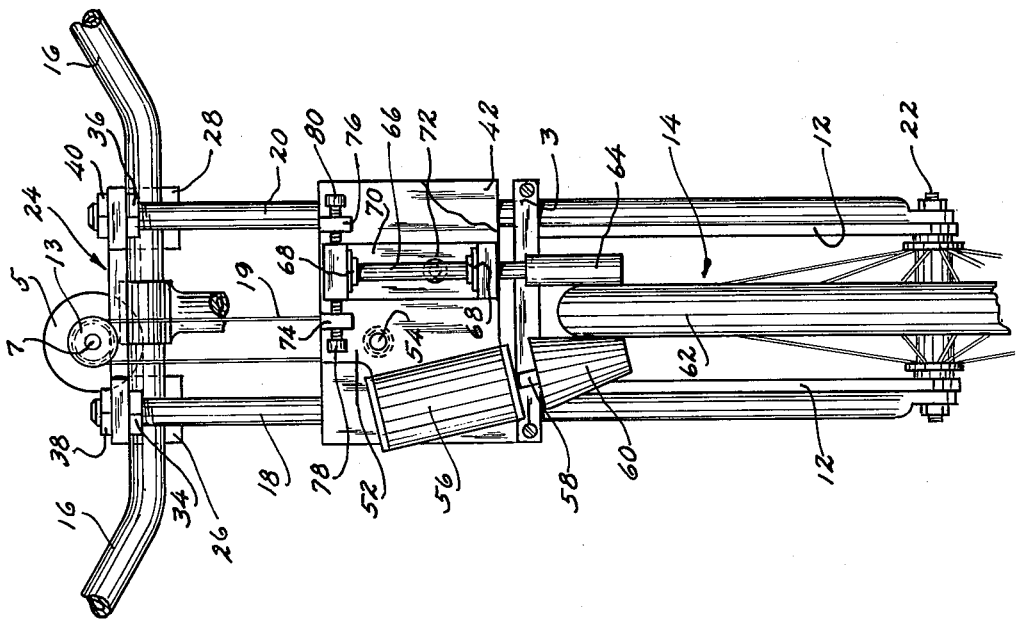
FIG. 2 is a front view looking rearwardly.
Figure 1:
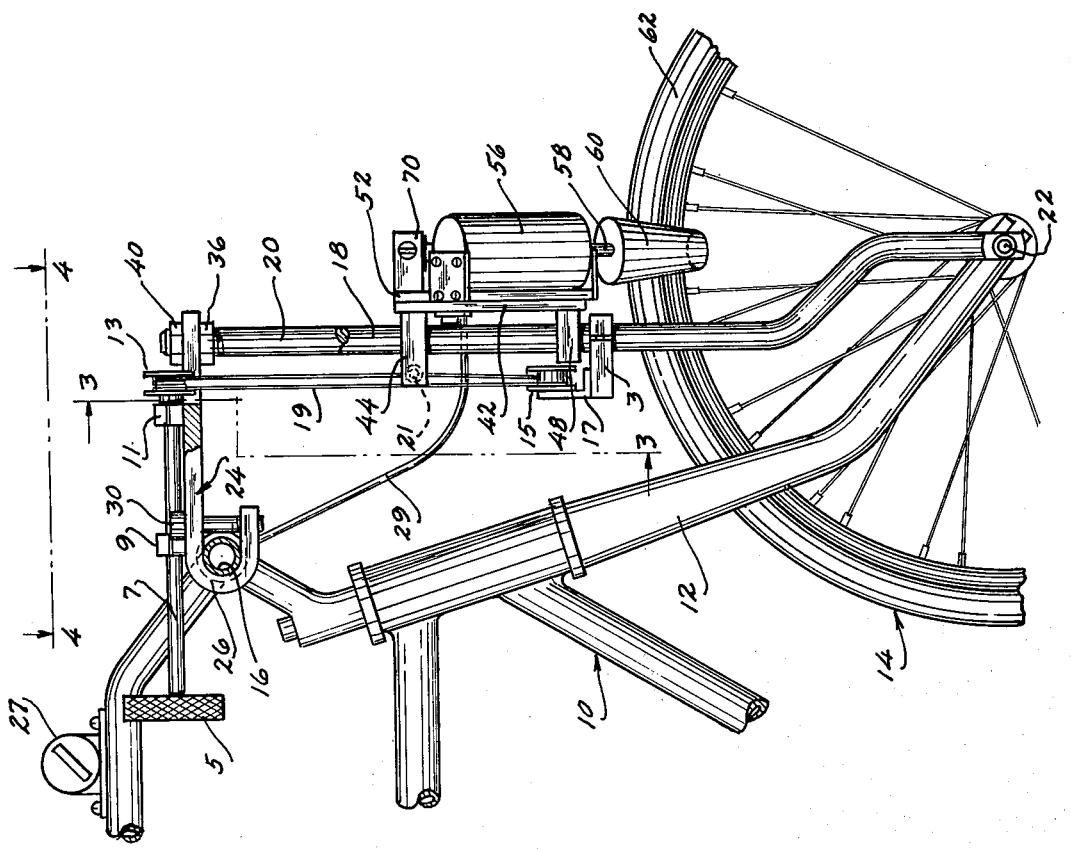
FIG. 1 is an elevational side view of a preferred embodiment of the invention as mounted at the front of the bicycle.

FIG. 1 shows a typical bicycle having a frame 10 comprising a fork 12, a wheel 14 and a handle bar 16. a pair of cylindrical guide members 18 and 20 extend upwardly from the wheel axle 22, and are mtually parallel. A base plate 24 is positioned on the handle bar portions 16—16, and comprises portions 26 and 28 which are formed about the handle bar portions as shown in FIGS. 1 and 4. Bolts 30 and 32 secure base plate 24 integrally with the handle bar portions 16—16. Base plate 24 extends forwardly to be supported by guide members 18 and 20 by nuts 34, 36, 38 and 40, by means of threads on the guide members.

A slide plate 42 is positioned forwardly of guide members 18 and 20, and is slidably supported on the guide members by guide blocks 44, 46, 48 and 50. A pivot plate 52 is pivotally mounted on the face of slide plate 42 by a pivot member 54. Plate 52 has integral therewith a motor 56 mounted thereon at a suitable angle as shown. The shaft 58 of motor 56 has integral therewith a cone drive roller 60 of a suitable material. Motor 56 is mounted at an angle such that the periphery of the roller 60 will lie in resilient engagement with the side surface of the tire 62, and common to a plane normal to the axis of the axle 22. Therefore, when slide plate 42 is shifted vertically along guide members 18 and 20, the cone-shaped roller 60 will engage the side surface of tire 62 at a sufficient and constant pressure to provide traction.

In order to assure positive engagement between cone 60 and the surface of tire 62, a cylindrical idler roller 64 on shaft 66 engages tire 62 at a position opposed to that of cone roller 60. Shaft 66 rotates freely in bearings 68 mounted in a bracket 70 which in turn is pivoted on plate 52 as at 72. A pair of posts 74 and 76 integral with plate 52 provide support for adjusting screws 78 and 80. Screws 78 and 80 abut the bracket 70 for the purpose of supporting roller 64 in engagement with tire 62.

A stop member 3 is adjustably mounted on members 18 and 20 as shown, and for a purpose to be made clear. The means of controlling the rate of travel of the bicycle is shown in FIGS. 3 and 4, and comprises a knob 5 supported integrally on a shaft 7 mounted for rotation in a pair of blocks 9 and 11 which are mounted on plate 24. A pulley 13 is secured to shaft 7. A second pulley 15 comprises an idler, is supported on stop member 3 by a bracket 17. A belt 19 of suitable material preferably of a cylindrical shape, is passed about pulley 13 a sufficient number of times to prevent slippage about the pulley or otherwise secured thereto. One end of belt 19 is secured to the guide block 44 by suitable means such as by screw 21. The opposite end of belt 19 is anchored to the guide block 46 by a screw 23 or such means. Referring to FIG. 3, rotation of shaft 7 in the direction of arrow 25 will lower plate 42 relative to guide members 18 and 20, consequently lowering the roller 60, thus presenting a larger diameter of the cone roller 60 to the surface of the tire 14, thereby increasing the rate of travel of the bicycle. Rotation of the knob 5 in the opposite direction will reduce the rate of travel as the cone roller 60 presents a smaller diameter to the tire 14.

The source of power is a battery mounted in a suitable position on the frame 10, possibly at the rear, but not shown. A conventional switch 27 or a suitable circuit including a solenoid, can be mounted at a convenient location, such as on the handle bar 16 as shown in FIG. 1. A suitable cable 29 extends from the switch 27 to the motor 56.

FIG. 5 concerns the use of two opposed motors 31 and 33 mounted on a pivot plate 35 which is pivoted as at 37 to the slide plate 42. Motors 31 and 33 are pivoted on plate 35 as at 39 and 41. A toggle linkage 43 links motors 31 and 33 together, and a control rod 45, guided by a follower in slot 47 permits control of the pressure of rollers 49 and 51 when in engagement with the tire 14.

FIGS. 6 and 7 concern the use of this invention in combination with low pressure "balloon" tires. The excessive yielding of these tires would not provide a satisfactory engaging surface to assure sufficient tractive force for the cone rollers. Referring to FIGS. 6 and 7, the tire 53 and tube 55 are supported on the rim 57 by a circumferential auxiliary rim 59 of a suitable material such as rubber of a suitable stiffness. Rim 59 comprises an integral rim-lining portion 61 terminating in a portion 63 conforming to the walls of the tire 53. Portion 63 terminates in faces 65 which diverge toward the axis of the wheel 71. Roller-engaging faces 67 lie in planes normal to the axis of wheel 71, thus providing traction surfaces against which the rollers 60 and 64 can make positive contact.

The above being a complete description of an illustrative embodiment of the invention, what is claimed as new and desired to be secured by Letters Patent of the United States is:

1. In a vehicle having a frame, a wheel supported on an axle on said frame and a tire on said wheel, in combination, a propelling means for said vehicle comprising a power unit on said frame comprising a motor mounted on a support and having a shaft, said support being shiftable relative to said frame in a direction normal to said axle, the axis of said shaft being directed downwardly-convergent toward said wheel and relative to a plane normal to said axle, a cone-shaped roller integral with said shaft and positioned in engagement with said tire, said roller having a degree of taper providing substantially invariable frictional contact pressure with said tire during shifting of said power unit normal to said axle.

2. In a vehicle as set forth in claim 1, which has an upwardly-positioned control means comprising an upwardly-extending flexible member secured at a first end thereof to said support and trained peripherally about a rotatable control member supported on said frame, said flexible member being then downwardly directed and about a downwardly-positioned idler member secured to said frame, said flexible member than extending upwardly from said idler member and secured integrally to said support at a second point transversely positioned from said first end.

* * * * *